United States Patent [19]

Frey

[11] Patent Number: 4,583,935
[45] Date of Patent: Apr. 22, 1986

[54] APPARATUS FOR FORMING THERMOPLASTIC LAMINATES INTO MAJOR SECTIONS

[75] Inventor: Luthur R. Frey, Sedgwick County, Kans.

[73] Assignee: The Boeing Company, Seattle, Wash.

[21] Appl. No.: 665,551

[22] Filed: Oct. 29, 1984

[51] Int. Cl.[4] ............ B29C 61/10; B29C 53/04
[52] U.S. Cl. ................. 425/384; 425/402
[58] Field of Search ................ 425/384, 402

[56] References Cited

U.S. PATENT DOCUMENTS

| | | | |
|---|---|---|---|
| 1,877,629 | 9/1932 | Replogle | 264/339 |
| 2,420,119 | 5/1947 | Boehm et al. | 264/339 |
| 2,480,774 | 8/1949 | Rossheim et al. | 72/342 |
| 3,340,714 | 9/1967 | Pohl et al. | 72/342 |
| 3,557,277 | 1/1971 | Brodersen et al. | 264/316 |
| 3,861,847 | 1/1975 | Barnett | 425/384 |
| 3,884,612 | 5/1975 | Parmann | 425/384 |
| 3,890,079 | 6/1975 | Slater | 425/384 |
| 3,891,364 | 6/1975 | Muller | 425/384 |
| 3,922,899 | 12/1975 | Fremont et al. | 72/178 |
| 4,073,859 | 2/1978 | Baumgartner et al. | 264/322 |
| 4,160,006 | 7/1979 | Patzner et al. | 264/339 |
| 4,196,339 | 4/1980 | Russo | 219/243 |

*Primary Examiner*—Willard E. Hoag
*Attorney, Agent, or Firm*—Kokjer, Kircher, Bradley, Wharton, Bowman & Johnson

[57] ABSTRACT

Apparatus for bending flat thermoplastic laminates into structural shapes such as angles, channels, Z sections, J sections and I sections. In order to bend the laminate into the desired shape by appropriate tooling, heat is applied in a localized manner only to the area that is to be bent. The application of heat is sufficient to heat the laminate to its softening temperature in the bend area, and the plies of the laminate can thus slip in the bend area only as bending force is applied so that the bend can be made without the need to heat the entire laminate to the softening temperature.

2 Claims, 10 Drawing Figures

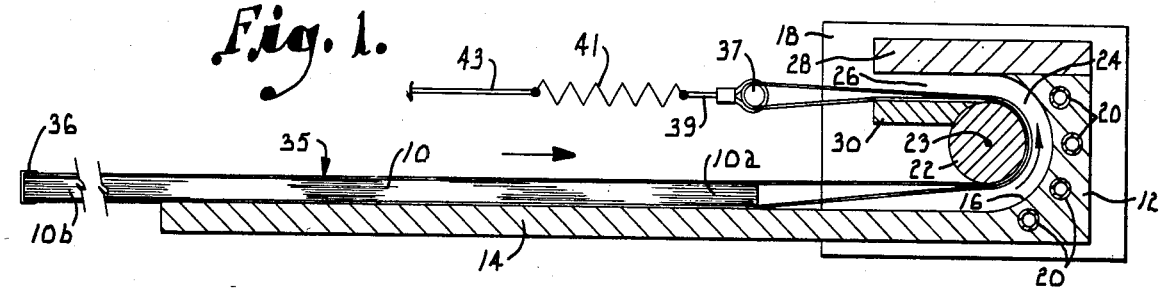
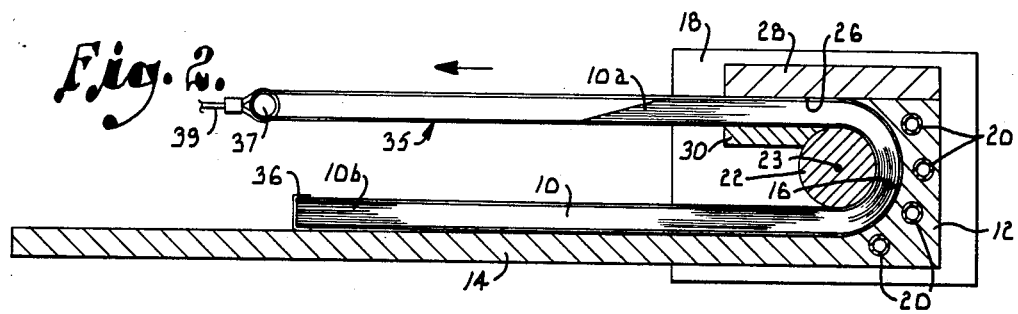
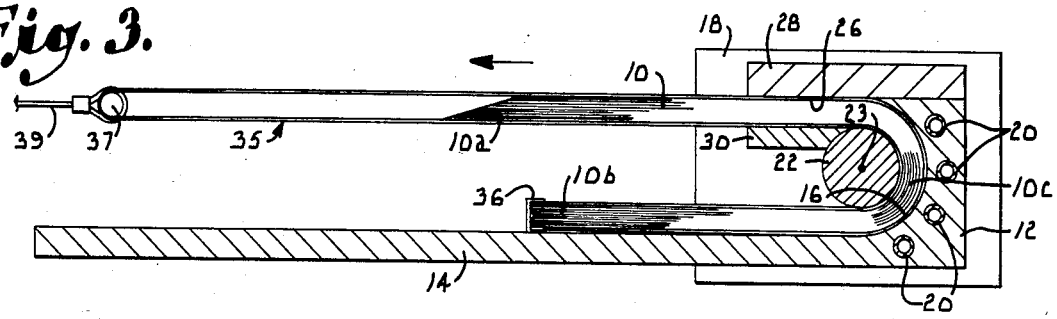
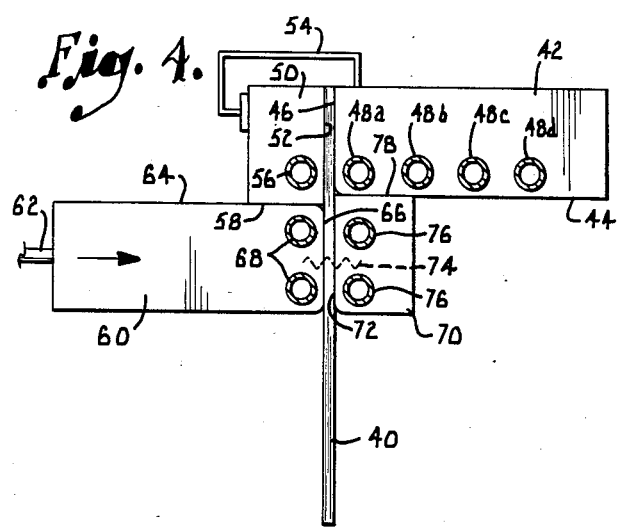
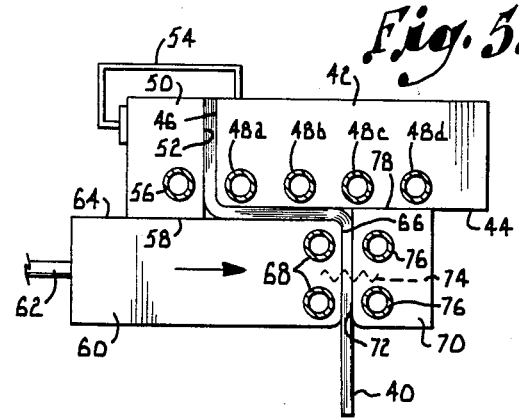
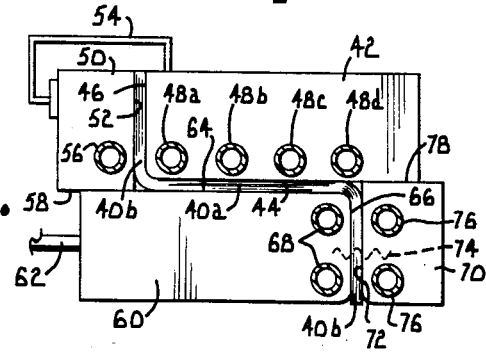

APPARATUS FOR FORMING THERMOPLASTIC LAMINATES INTO MAJOR SECTIONS

BACKGROUND OF THE INVENTION

This invention relates in general to the field of thermoplastics and deals more particularly with the forming of thermoplastic laminates into various shapes.

Because thermoplastic laminates have many desirable qualities, they are widely used in a variety of applications. However, a major drawback associated with thermoplastic laminates is the considerable difficulty that is encountered in forming the laminates into the shape that are necessary for them to function as major structural members. The most desirable laminates are obtained by consolidating multiple plies into flat sheets which harden when cooled to room temperature from the elevated consolidation temperature. Subsequent curving or bending of the laminate requires that the plies slip relative to one another, and this can be achieved only if the laminate is heated to the softening temperature at which ply slippage can occur.

In the past, techniques common in the metal bending technology have been used with thermoplastic laminates, despite the recognized differences in the properties of thermoplastic as compared to metal. For example, the entire laminate and sometimes the bending tool are heated to the softening temperature of the thermoplastic to allow ply slippage anywhere in the laminate at the same time. As can easily be appreciated, this technique requires a considerable amount of heat because it relies on heating of the entire laminate to the softening temperature. Due to the high cost of energy, the excessive heat that is required to carry out this process makes its practicality marginal at best. In addition, the tooling that is required is unduly complex, and the costs are increased accordingly.

SUMMARY OF THE INVENTION

The present invention is directed to an improved method and apparatus which takes a novel approach to the shaping of laminated thermoplastic sheets. An important feature of the invention is the use of localized heating of the laminates only in the areas that are being bent so that the heat requirements are minimized and the ply slippage occurs only in the areas that are being bent. By using localized heating and effecting ply slippage in a unique way, thermoplastic laminates can be easily and economically formed into virtually any desired cross sectional shape. Complex shapes such as I and J sections which have not heretofore been practical for thermoplastic laminates can be formed in accordance with the present invention, as can angles, channels, Z sections and other configurations.

In accordance with the invention, tools having the appropriate shapes are used to effect bending of an initially flat thermoplastic laminate into a major section having the desired section. In the case of a 180° bend, the laminate is fed through a curved passage formed between a concave tool surface and a rotatable spool. The passage is heated so that only the portion of the laminate that is located in the passage at any one time is heated to the softening temperature of the thermoplastic. Thus, only the portion of the laminate that is being bent is heated to a temperature at which ply slippage can occur. The remainder of the laminate remains below the softening temperature.

In the case of shapes such as angles, channels and Z sections, two or more tools are moved relative to one another to bend the laminate in the desired configuration while heat is applied in a localized manner only to the areas of the laminate where bending is taking place. The heat is preferably applied by heating tubes which are selectively energized and deenergized to heat only the bend area of the laminate, thus minimizing the energy consumption without hindering the bending operation. More complicated shapes such as I and J sections can be formed by including plies of foil such as titanium foil in the laminate and using special tools to bend the opposite sides of the separated laminate in opposite directions to form two flanges, again with the application of localized heat only to the areas that are being bent.

DESCRIPTION OF THE DRAWINGS

In the accompanying drawings which form a part of the specification and are to be read in conjunction therewith and in which like reference numerals are used to indicate like parts in the various views:

FIG. 1 is a diagrammatic sectional view showing tooling which can be used in accordance with the present invention to achieve a bend of 180° in a flat thermoplastic laminate, with the laminate being fed toward the tooling;

FIG. 2 is a diagrammatic view similar to FIG. 1, but showing the laminate pulled partially through the tooling;

FIG. 3 is a diagrammatic view similar to FIGS. 1 and 2 but showing the laminate pulled more fully through the tooling around a spool by a thin sheet metal strap arrangement secured to the leading end of the laminate;

FIG. 4 is a diagrammatic view showing a pair of tools which may be used to bend a flat thermoplastic laminate into a Z shaped section in accordance with the present invention, with the movable tool in its initial position prior to the bending of the laminate;

FIG. 5 is a diagrammatic view similar to FIG. 4 but showing the movable tool advanced to partially shape the laminate into a Z shaped section;

FIG. 6 is a diagrammatic view similar to FIGS. 4 and 5 but showing the movable tool fully advanced to form the laminate into a Z shaped section;

DETAILED DESCRIPTION OF THE INVENTION

Figure 7:
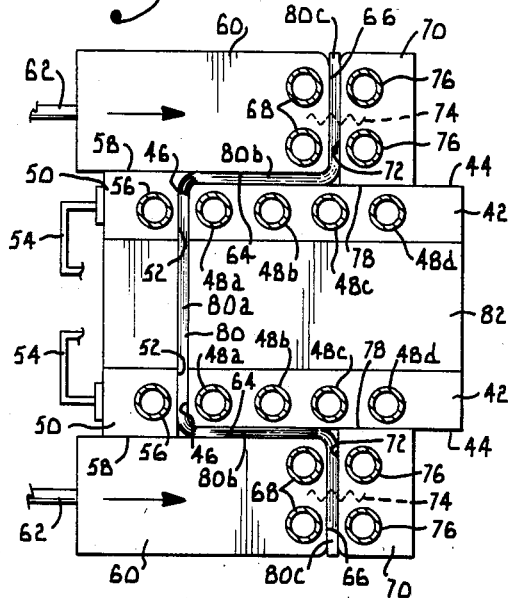
FIG. 7 is a diagrammatic view showing tools which are used to form a flat thermoplastic laminate into a hat shaped channel section in accordance with the invention.

Referring now to the drawings in more detail and initially to FIGS. 1-3, numeral 10 generally designates a thermoplastic laminate formed by multiple plies bonded together face to face to form a relatively thick, flat sheet. As is well known, the laminate 10 can be formed by consolidating the plies at an elevated softening temperature of the thermoplastic and then allowing the laminate to cool to room temperature. at room temperature, the laminate 10 is in the form of a hard, flat sheet. The thickness of the laminate 10 can vary as desired.

In accordance with the present invention, a tool 12 has a flat bed portion 14 which leads to a uniformly curved concave surface 16 formed on the tool 12. The concave surface 16 curves through an arc which in the illustrated embodiment is approximately 180°. Suitable support plates 18 may be provided to support the tool 12.

The tool 12 is heated by a plurality of heating tubes 20 which are arranged in an arcuate pattern extending generally along and adjacent to the concave surface 16. The heating tubes 20 are spaced apart from one another along substantially the entire extent of surface 16. The tubes 20 may be heated by any suitable means. Preferably, the tubes incorporate infrared heaters, but other types of heating elements may be employed as well.

A cylindrical spool 22 is supported for rotation about a central axis 23 which may extend between the support plates 18. This spool 22 may also be heated as required to attain forming temperature in the laminate. The cylindrical outside surface of the spool 22 is spaced from the concave surface 16 of tool 12 and cooperates therewith to form a curved passage 24 having a uniform width substantially equal to the thickness of the laminate 10. Passage 24 extends through an arc of approximately 180°, although other configurations are possible.

The passage 24 has an outlet end 26 formed between upper and lower blocks 28 and 30. Blocks 28 and 30 are maintained at a temperature well below the softening temperature of the thermoplastic material which forms the laminate 10, and the laminate is thus cooled below the softening temperature in the outlet portion 26 of the passage.

In order to form the laminate 10 into a 180° bend, the laminate is initially trimmed to the width of the spool 22. The heating tubes 20 are energized to heat the concave surface 16 to a temperature at least as great as the softening temperature of the thermoplastic which is to be formed. Obviously, if necessary in view of the particular laminate being formed, spool 22 may also be heated at this time. Normally, this temperature is in the range of approximately 650°-700° F. By heating the surface 16 and spool 22, if necessary, passage 24 is heated to in turn heat the portion of the laminate which is fed into the curved passage 24.

The laminate 10 is disposed flatly on the bed 14 with a leading marginal edge disposed between the ends of an elongated, flexible strap 35 which may be of sheet metal or the like. Strap 35 is bent back upon itself and looped around a transversely circular shaft 37. One end of a short length of cable 39 is attached to shaft 37 and the other end of cable 39 is attached to an end of a spring 41. The other end of spring 41 is attached by a cable 43 to a pulling unit (not shown).

The flexible straps 34 are firmly secured to laminate 10 by suitable clamps 36.

The laminate 10 is slowly pulled on the bed such that its leading end 10a is extended into and through the heated passage 24. As the leading end portion of the laminate is fed into passage 24, it is heated to the softening temperature at which the plies of the thermoplastic laminate slip relative to one another. This ply slippage permits the laminate to gradually and smoothly bend in conformity with the curved shape of passage 24 which applies a bending force to the laminate as it is fed through the passage. Since the plies which are relatively far from the spool 22 must travel a greater distance than plies which are closer to the spool, ply slippage is necessary, and the leading end 10a of the laminate assumes the beveled configuration shown in FIG. 2 as it passes through the passage 24. Once the leading end 10a has reached the outlet 26 of the passage, its bending is complete and no additional ply slippage need occur in that part of the laminate. The leading end 10a is cooled below the softening temperature as it passes through the relatively cool outlet 26 of the passage, and the trailing portions of the laminate are subsequently bent, as they pass through the passage 24 and are heated by the heat generated by the heating tubes 20 and heated spool 22, and cooled as they pass through outlet 26. Controlled tension can be maintained on cable 43 in order to pull the laminate into the passage in the desired fashion. Spring 41 serves to assure uniformity of the forces on the laminate during the forming operation.

The laminate can be pulled through the passage 24 any desired distance. In order to form a 180° bend 10c near the center of the laminate, the feeding can be terminated at the position shown in FIG. 3. The heating tubes 20 and the means for heating spool 22 can then be deenergized to cool the tool and the laminate. Once the laminate has cooled sufficiently to harden, the spool 22 can be released and removed, and the bent laminate 10 can then be removed from the tool assembly.

It is important to recognize that only the passage 24 is heated so that heat is applied only to the portion of the laminate that is being bent at any time. Consequently, the laminate is heated only in those areas at which ply slippage is required to effect the necessary bend in the laminate, and this localized application of heat to the laminate conserves energy while at the same time allowing the ply slippage to occur as required. The trailing end portion 10b of the laminate which remains on the bed 14 at the time the feeding of the laminate is terminated is not heated at all and remains in the hardened condition at all times. By avoiding the heating of the entirety of the laminate 10, the possibility of delamination is minimized, and the plies are tighly bonded together throughout the laminate at the end of the forming operation.

Referring now to FIGS. 4–6, the principles of the present invention can be used to form an initially flat sheet of thermoplastic laminate 40 into a Z shaped section. A stationary tool 42 has a flat forming surface 44 on one side and a flat clamping surface 46 on an adjacent side. The forming and clamping surfaces 44 and 46 intersect at a right angle at one corner of the stationary tool 42. This corner is radiused to the inside bend radius desired for the finished part. A plurality of heating tubes 48a, 48b, 48c and 48d are provided in the stationary tool 42 and are arranged in a straight row extending generally along and adjacent to the forming surface 44. The heating tubes may be infrared heating tubes or any other suitable type of heating elements.

A clamping block 50 is used to clamp one end portion of the laminate 40 against the clamping surface 46. The clamping block 50 is movable toward and away from surface 46 and cooperates therewith to form a thin passage or channel 52 therebetween. The end portion of the laminate is received in the passage 52. A suitable clamp mechanism 54 serves to rigidly clamp the laminate 40 in channel 52 against the clamping surface 46. The clamping block 50 is provided with a single heating tube 56 which is located adjacent to the intersection between the forming and the clamping surfaces 44 and 46 of tool 42.

The clamping block 50 projects slightly beyond the forming surface 44 of tool 42, and a flat guide surface 58 is presented on the end of the projecting portion of block 50. The guide surface 58 is offset from the forming surface 44 by a distance substantially equal to the thickness of the laminate 40.

A movable tool 60 cooperates with the stationary tool 42 and can be moved generally along the forming surface 44 of the stationary tool. Numeral 62 identifies the rod of a hydraulic cylinder which serves to reciprocate the movable tool 60 between the positions shown in FIGS. 4 and 6.

The movable tool 60 has a flat forming surface 64 which is parallel to the forming surface 44 of the stationary tool. Intersecting with forming surface 64 at a right angle is a slide surface 66 formed on the leading end of the movable tool 60. This corner is radiused with an identical radius to that between surface 46 and surface 44 and serves to form the inside bend radius of the finished part. A pair of heating tubes 68 are provided in the movable tool and are spaced apart from one another adjacent to the slide surface 66.

A guide block 70 cooperates with the slide surface 66 to form a passage or channel 72 which receives the thermoplastic laminate 40. A spring 74 continuously urges the guide block 70 toward surface 66 in order to maintain the laminate 40 against the slide surface while at the same time permitting the laminate to slide along the slide surface due to the resiliency of the spring. The guide block 70 is provided with a pair of heating tubes 76 which are spaced apart from one another and located adjacent to the channel 72.

The guide block 70 projects beyond the forming surface 64 of the movable tool 60. A flat guide surface 78 formed on block 70 is offset from the forming surface 64 of the movable tool by a distance substantially equal to the thickness of the laminate 40. Guide surface 58 is in constant contact with forming surface 64, and the other guide surface 78 is in constant contact with the other forming surface 44.

The laminate 40 can be bent into a Z shaped section by initially inserting the laminate into the aligned channels 52 and 72, as shown in FIG. 4. The end portion of the laminate is rigidly clamped in channel 52 and against the clamp surface 46 by tightening the clamp 54. After forming temperature is reached in laminate 40, a predetermined force can be exerted by the cylinder rod 62 to move the movable tool 60 to the right. The path of movement of the movable tool is perpendicular to the channels 52 and 72 and maintains the forming surfaces 44 and 64 parallel to one another and uniformly spaced apart a distance substantially equal to the thickness of the laminate 40.

Before the movement of the movable tool 60 begins, heating tube 56 is energized along with both of the heating tubes 68 and both of the heating tubes 76. However, only the first heating tube 48a of the stationary tool is energized at this time. As soon as forming temperature is reached, and the movable tool begins to move, only the portion of the laminate adjacent the intersection between surfaces 44 and 46 is heated from opposite sides thereof by the energized heating tubes. The heat is thus applied to the laminate in a localized manner and is sufficient to raise the temperature to the softening temperature necessary to permit the plies of the laminate to slip relative to one another. Therefore, as the movable tool 60 is moved from the position of FIG. 4 toward the position of FIG. 5, the ply slippage resulting from the localized application of heat permits the laminate to bend through a right angle at the intersection between surfaces 44 and 46 where the bending force is applied. The laminate also bends through a right angle at the intersection between surfaces 64 and 66. The ply slippage is equal and opposite at the two corners, so no ply slippage occurs anywhere else in the laminate. As the movement of tool 60 progresses, the force of spring 74 maintains the laminate against surface 66 while permitting it to slip along surface 66 in a direction parallel to the laminate.

After the laminate has been bent at the intersection between surfaces 44 and 46, heating tube 56 is deenergized. As the movable tool continues to move to the right, the heating tubes in the stationary tool 42 are energized and deenergized in a pattern to maintain localized heating of the laminate only in the area that is being bent. As channel 72 moves away from it, tube 48a is deenergized, and heating tubes 48b and 48c are energized in succession as the area of the laminate which is being bent progressively moves to the right. When the position of FIG. 5 is reached, both tubes 48b and 48c are preferably energized, while tubes 48a and 48d are deenergized. As tool 60 approaches the position shown in FIG. 6, tubes 48b and 48c are deenergized in succession and tube 48d is energized since it is then located adjacent to the area at which the laminate is being bent. Tubes 68 and 76 remain energized throughout the forming operation.

The movement of tool 60 is terminated when the position of FIG. 6 is reached. At this time, the laminate has been bent into the shape of a Z having its web 40a formed between the confronting forming surfaces 44 and 64 and its two legs or flanges 40b formed in the channels 52 and 72. All of the heating tubes can then be deenergized to allow the laminate to cool until it hardens. Once the laminate has hardened, it can be removed from the tools, and the movable tool can be returned to its initial position (FIG. 4).

The end of the laminate which is clamped in channel 52 is not heated at all, and the opposite end which is located in channel 72 at the end of the shaping operation has not been deformed at all. Due to the localized application of heat to the laminate, only the area of the laminate which is being bent is heated so that the heating requirements are minimized and ply slippage is allowed only where necessary to permit the laminate to be bent as desired.

It is noted that the movement of the movable tool 60 can be terminated at any time so that a Z section with unequal legs could be formed. Similarly, the movable tool can be moved to the right beyond the position of FIG. 6 to form an angle member once the laminate has slipped completely out of channel 72.

The arrangement shown in FIG. 7 can be used to form an initially flat thermoplastic laminate 80 into a hat shaped channel section. A pair of stationary tools are included in the arrangement of FIG. 7, and the same reference numerals are used to identify the components of the stationary tools as were used in FIGS. 4–6. Each stationary tool 42 has a clamp block 50 cooperating therewith in the same manner discussed in connection with FIGS. 4–6. A spacer 82 is interposed between the stationary tools 42, and the forming surfaces 44 of the two tools 42 face in opposite directions on opposite sides of the spacer 82.

A pair of movable tools 60 which may be identical to the movable tools 60 shown in FIGS. 4-6 are included in the arrangement of FIG. 7, along with a guide block 70 for each movable tool. The movable tools 60 move adjacent to the forming surfaces 44 of respective stationary tools 42 as described earlier.

The laminate 80 is initially in the shape of a flat sheet formed by multiple plies. Channels 52 and 72 are initially aligned with one another, and the laminate is inserted into the channels with a central portion thereof clamped in channels 52 of the stationary tools by clamps 54. When forming temperature is reached as described for FIGS. 4-6, the movable tools are moved to the right by extension of the cylinder rods 62, and as the movable tools progress, the heating tubes 48a-48d are energized and deenergized in the same pattern described in connection with FIGS. 4-6. Heating tubes 56 are deenergized after the initial bends are made in the laminate at the opposite ends of the portion which is clamped in the channels 52. Tubes 68 and 76 remain energized throughout the forming operation.

Once the movable blocks have reached the position of FIG. 7, their movement may be terminated. In this position, the laminate 80 has taken the form of a hat shaped channel member having a web 80a formed in channels 52, sidewalls 80b formed between the confronting forming surfaces 44 and 64, and flanges 80c formed in the channels 72 of the movable tools. It should be noted that movement of the tools 60 can continue until the laminate has slipped completely out of channels 72. Then, a channel without flanges will have been formed.

As in the arrangements previously described, the arrangement of FIG. 7 effects localized application of heat to the laminate only at the areas which are being bent. Therefore, the heating requirements are again minimized and ply slippage is allowed only in the necessary area or areas of the laminate. Spacers having different sizes can be used in place of spacer 82 to provide the channel member with a web having virtually any length.

Figure 8:
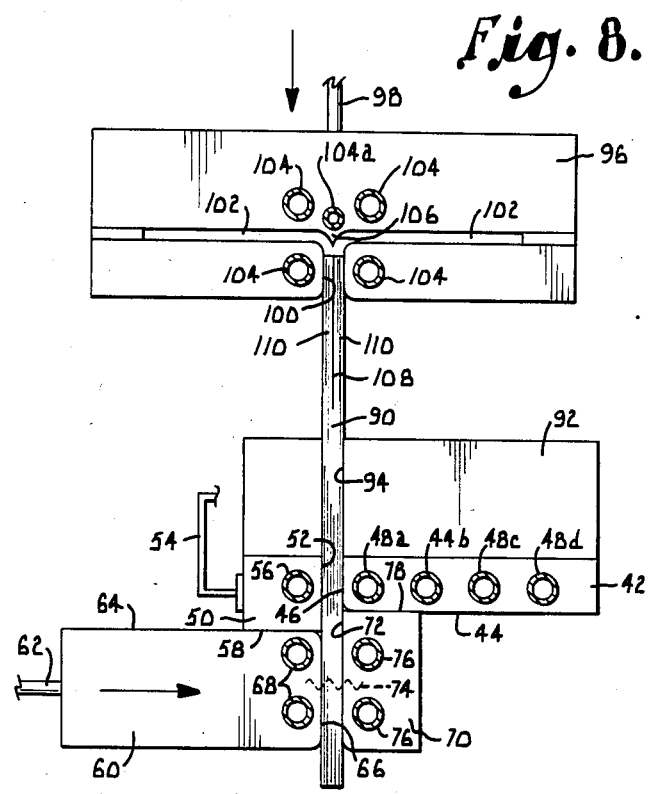
FIG. 8 is a diagrammatic view showing tools which can be used to form a flat thermoplastic laminate into a J shaped section in accordance with the invention, with the two movable tools in their initial positions prior to shaping of the laminate.
Figure 9:
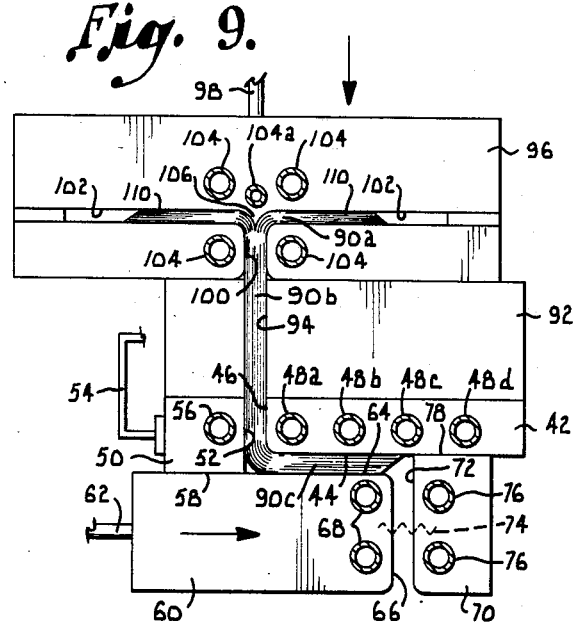
FIG. 9 is a diagrammatic view similar to FIG. 8 but showing the movable tools fully advanced to form the laminate into a J shaped section.

The arrangement show in FIGS. 8 and 9 can be used to form a thermoplastic laminate 90 into a J shaped section. A stationary tool 42 and a movable tool 60 having the same construction as described previously are included, along with a clamp block 50 and a guide block 70. A spacer 92 is attached to the stationary tool 42 on the side opposite the forming surface 44, and the spacer 92 presents a channel 94 in alignment with channel 52 to receive the laminate.

A second movable tool 96 can be moved toward and away from the spacer 92 by a rod 98 which may be the rod of a hydraulic cylinder. A cavity which is formed in tool 96 includes a passage 100 which extends into the bottom surface of the tool and has a width substantially equal to the thickness of the laminate 90. At its top end, passage 100 intersects with a pair of cross channels 102 which extend in opposite directions from the passage 100. The cross channels 102 are aligned with one another and are oriented perpendicular to passage 100. Tool 96 is provided with a plurality of heating tubes 104 which are located adjacent to the intersection between passage 100 and channels 102 on opposite sides of the passage and channels. At the top end of passage 100, a divider in the nature of a tapered, radiused rib 106 is formed in order to guide the laminate into the cross channels 102 as will subsequently be described. A relatively small heating tube 104a is located adjacent to divider 106.

Figure 10:
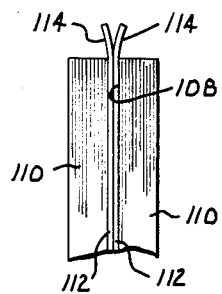
FIG. 10 is a fragmentary view on an enlarged scale of the upper end portion of the thermoplastic laminate shown in FIG. 8.

Laminate 90 is provided during consolidation of the laminate from the multiple plies of material, with a pair of thin foil sheets 112 interposed in the laminate to effectively separate the laminate into a pair of branches 110 (FIG. 10). The foil sheets are interposed in face to face relationship and, while each is bonded to its respective adjacent branch 110, the foil sheets are not bonded together. Titanium foil is presently preferred for this purpose in view of the similar physical properties between titanium and commonly used laminate materials, but other foils can be used.

The mutually unbonded foil sheets 112 provide a division between laminate branches 110, and are usually placed so that the two branches are of identical thicknesses, namely one-half of the total thickness of the laminate. The sheets of foil insure that the branches 110 may be easily separated from one another. Each foil sheet has a projecting end or tab 114 which extends out of the division 108 between the branches. The space between tabs 114 provides a lead-in area which facilitates separation of the branches 110.

Laminate 90 can be formed into a J shaped section by initially inserting it through channels 52, 72 and 94 with the top end of the laminate extending into the passage 100 of tool 96. The central portion of the laminate is clamped in passages 52 and 94 by tightening the clamp 54. Tool 60 can be moved to the right in order to bend the lower end of the laminate in the manner described previously. When the laminate has slipped completely out of channel 72, tool 60 will have reached the position shown in FIG. 9 and its movement can then be terminated. The heating tubes 48a-48d are energized and deenergized in the sequence described earlier to apply localized heat only to the area that is undergoing bending.

Simultaneous with the movement of tool 60, tool 96 is moved downwardly toward the spacer 92. As tool 96 moves downwardly, the divider 106 enters the space between the projecting ends 114 of the foil sheets 112. Continued downward movement of divider 106 carries it between the foil sheets and into division 108 to cause the branches 110 to bend into channels 102. The heating tubes 104 and 104a are previously energized so that the branches 110 are bent through right angles into the cross channels 102 as the downward movement of tool 96 continues. When tool 96 has reached the position shown in FIG. 9, it is in contact with spacer 92 and its movement can then be terminated. At this time, the branches 102 together form a cross 90a on the top end of the J shaped laminate. The web 90b is formed in the channels 52 and 94, and the base leg 90c is formed between the confronting forming surfaces 44 and 64. Once the J shaped section has cooled enough to harden, it can be removed from the tool assembly.

It should be evident that a tool such as the movable tool 96 can be applied both to the top and bottom ends of a thermoplastic laminate in order to form the laminate into an I shaped section having crosses on both its top and bottom ends. In addition, spacers having various sizes can be used in place of spacer 92 to provide the web portion with virtually any desired length. As in previous arrangements, the localized manner in which heat is applied minimizes the heating requirements while allowing the ply slippage to occur in the areas which are being bent.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for bending a thermoplastic laminate having multiple plies bonded together to form a substantially flat sheet, said apparatus comprising:
   a forming tool having a curved surface;
   a rotatable spool member having a generally cylindrical configuration, said spool member being spaced from said curved surface of the forming tool and cooperating therewith for receiving the sheet and define a passage therebetween; and
   heating means located adjacent said curved surface of the forming tool for heating the sheet in said passage to an elevated temperature at which the plies of the laminate slip along with another, whereby the sheet can be fed into the passage with the ply slippage permitting the sheet to bend in conformity with the curvature of the passage.

2. Apparatus as set forth in claim 1, including a pair of block members located on opposite sides of an outlet end of said passage, said block members being maintained below said elevated temperature to effect cooling of the sheet below said elevated temperature as the sheet passes through said outlet end and out of the passage.

* * * * *